(No Model.)
C. B. BINGHAM.
ORE FEEDER.
No. 425,733. Patented Apr. 15, 1890.
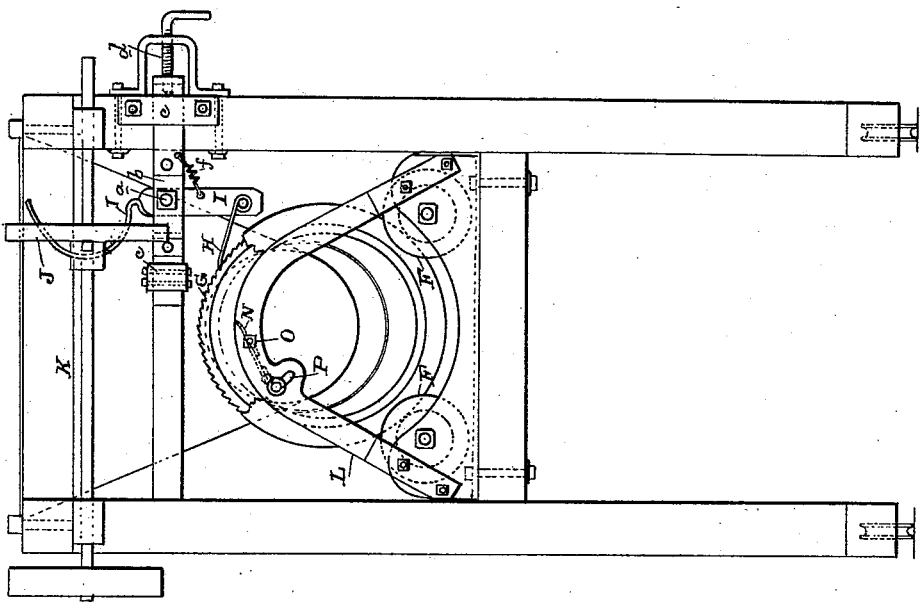
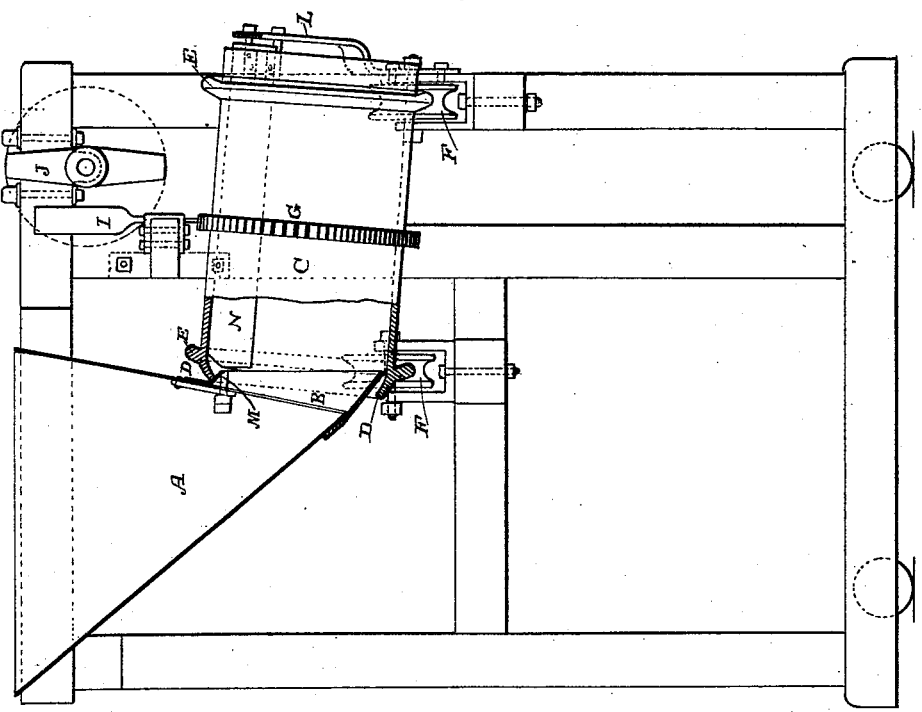
Witnesses,
Geo. H. Strong
J. H. Strust
Inventor,
Cullen B. Bingham
By Dewey & Co.
atty

UNITED STATES PATENT OFFICE.

CULLEN B. BINGHAM, OF VOLCANO, CALIFORNIA.

ORE-FEEDER.

SPECIFICATION forming part of Letters Patent No. 425,733, dated April 15, 1890.

Application filed August 14, 1889. Serial No. 320,753. (No model.)

*To all whom it may concern:*

Be it known that I, CULLEN B. BINGHAM, of Volcano, Amador county, State of California, have invented an Improvement in Ore-Feeders; and I hereby declare the following to be a full, clear, and exact description of the same.

My invention relates to a device for feeding ore to quartz mills and other crushing machinery; and it consists in the constructions and combinations of devices which I shall hereinafter fully describe and claim.

Figure 1 is an elevation, partially in section, of my improved ore-feeder. Fig. 2 is an end view showing the scraper in position.

A is a hopper, which in the present case is shown triangular in shape, having an opening upon one side at the lower edge through which the ore may pass from the hopper through a short directing chute or extension B and discharge into the cylinder C. This cylinder has a flange D, which partially incloses the extension B, and thus prevents the ore from spilling out at this end.

Around the cylinder C, near each end, are fixed the projecting rings or flanges E, which rest upon supporting anti-friction rollers F, these rollers being grooved so as to receive the edges of the circular ribs E and support them, and thus support the cylinder at four points, giving it a steady bearing and allowing it to turn easily upon these rollers.

Various devices may be employed to rotate the cylinder, such as a friction-clutch of well-known description, or, as shown in the present case, a pawl-and-ratchet mechanism. In this case I have shown a ratchet-wheel G surrounding the cylinder, and a pawl H engages with this ratchet-wheel. This pawl is pivoted upon an arm I, this arm being caused to oscillate or swing by means of a cam J upon a driving shaft K, which is journaled upon the frame of the feeder and driven by a belt and pulley or other suitable connecting device. When this shaft is rotated, the cam J acts upon the arm I and thus causes it to oscillate and move the pawl H, which engages the ratchet-wheel G at each oscillation, and thus turns the cylinder. The speed of rotation of the cylinder is determined by the adjustment of the movable arm, so as to cause the pawl to swing to a greater or less extent, as may be desired.

The swinging arm which carries the pawl is fulcrumed at $a$ upon a plate $b$, which slides in guides $c$, and it may be moved in either direction by means of a screw $d$, so as to move the curved arm I into or out of line with the cam J. When it is moved forward, so that the cam strikes it with its fullest effect, the pawl will move the feed-wheel G and cylinder so as to produce the greatest feed, and when the arm is withdrawn the action of the cam will be reduced and may be entirely stopped. The pawl may be returned after each impulse by a spring $f$ or other suitable device. The cylinder C is supported upon rollers F, so that it stands at a slight angle, and these rollers, at one end or both ends, may be raised or depressed by any suitable means, so as to change the angle of the cylinder and make it feed slower or faster at will.

Upon any suitable portion of the frame-work at the outer or discharge end of the cylinder is fixed an arched arm L, which extends across the upper front portion outside of the cylinder, as shown, and at the rear end a supporting-plate M is fixed to the hopper or any suitable part of the apparatus, so as to form a support for the inner end of the scraper. The scraper N is pivoted between these two supports by means of the pins O, so that the upper edge of the scraper extends along in contact with the upper interior periphery of the cylinder. The opposite end of the scraper extends backwardly from the supporting-pins O, and has an adjusting shaft or bar connected with and extending through slots P in the end supports, having a locking-nut on the end whereby the scraper may be adjusted to press more or less upon the interior of the cylinder, and also from time to time to compensate for any wear on its edge. When dry ore is to be fed, this scraper is of no particular use; but the majority of ore is more or less wet and sticky with clay and other ingredients, and the cylinder, if employed without the scraper, would soon fill up and become clogged, so that it would become useless as a feeder. This scraper acts to force off any ore which sticks to the inside of the cylinder and cause it to drop to the bottom, and as the cylinder stands at an inclination the point to which the ore falls when it drops from the scraper will be slightly in front of the point where it first adhered to the cylinder, and this and the inclination of the cylinder gradually feeds the ore forward until it is discharged through the outer end, and into the crushing mortar or other apparatus.

Having thus described my invention, what I claim as new, and desire to secure by Letters Patent, is—

1. A cylinder mounted upon supporting-rollers so as to stand at an inclination, a conoidal flange at the receiving end, an extension projecting from the feed-hopper into said flange, a ratchet or clutch mechanism whereby the cylinder is revolved in short impulses, a fulcrumed arm upon which the actuating-pawl is supported, an adjustable slide which carries the arm, and a cam mounted upon a counter-shaft and engaging the pivoted arm to move said arm and its attached pawl, substantially as described.

2. The inclined rotating cylinder and the hopper discharging into the upper end of said cylinder, a ratchet-wheel fixed to the cylinder, and a pawl suspended from a swinging arm and engaging said ratchet, a rotating cam by which the swinging arm is actuated, in combination with a slide to which the swinging arm is fulcrumed, and a screw whereby it may be advanced or retreated so as to increase or diminish the movements of the pawl, substantially as described.

3. The inclined rotating cylinder, the feed-hopper discharging into the upper or receiving end thereof, in combination with a blade or scraper extending along in contact with the inner periphery of the cylinder, said scraper being fulcrumed upon pivots and having a projecting arm, adjusting screw and nut, and slotted holder, substantially as described.

In witness whereof I have hereunto set my hand.

CULLEN B. BINGHAM.

Witnesses:
S. H. NOURSE,
H. C. LEE.